(12) United States Patent
Satoh et al.

(10) Patent No.: US 8,294,918 B2
(45) Date of Patent: Oct. 23, 2012

(54) APPARATUS AND METHOD FOR GENERATING A SIMULATED IMAGE INCLUDING AN IDENTIFIED IMAGE ABNORMALITY

(75) Inventors: Osamu Satoh, Sagamihara (JP); Yasushi Nakazato, Setagaya-ku (JP); Kohji Ue, Kawasaki (JP); Masahide Yamashita, Ota-ku (JP); Jun Yamane, Yokohama (JP); Masaichi Sawada, Setagaya-ku (JP); Noriyuki Ochiai, Yokohama (JP); Shintaroh Takahashi, Kawasaki (JP)

(73) Assignee: Ricoh Company, Ltd., Tokyo (JP)

( * ) Notice: Subject to any disclaimer, the term of this patent is extended or adjusted under 35 U.S.C. 154(b) by 1399 days.

(21) Appl. No.: 11/857,132

(22) Filed: Sep. 18, 2007

(65) Prior Publication Data
US 2008/0068639 A1     Mar. 20, 2008

(30) Foreign Application Priority Data

Sep. 19, 2006 (JP) ................................. 2006-253404
Dec. 5, 2006 (JP) ................................. 2006-328433

(51) Int. Cl.
*G06K 15/00* (2006.01)
(52) U.S. Cl. ............... 358/1.14; 399/9; 399/15; 399/16; 714/4.12
(58) Field of Classification Search ................. 358/1.14, 358/504, 1.15
See application file for complete search history.

(56) References Cited

U.S. PATENT DOCUMENTS

| | | | |
|---|---|---|---|
| 7,110,917 B2 | 9/2006 | Matsuura et al. | |
| 7,184,674 B2 | 2/2007 | Satoh et al. | |
| 7,203,431 B2 | 4/2007 | Shoji et al. | |
| 2004/0190057 A1* | 9/2004 | Takahashi et al. | 358/1.15 |
| 2005/0002054 A1 | 1/2005 | Shoji et al. | |
| 2005/0157327 A1* | 7/2005 | Shoji et al. | 358/1.14 |
| 2005/0193027 A1 | 9/2005 | Hasegawa et al. | |
| 2005/0213129 A1* | 9/2005 | Matama | 358/504 |
| 2005/0248801 A1 | 11/2005 | Miyahara et al. | |
| 2005/0281596 A1 | 12/2005 | Nakagawa et al. | |
| 2005/0286916 A1 | 12/2005 | Nakazato et al. | |
| 2006/0182451 A1 | 8/2006 | Shoji et al. | |
| 2006/0294252 A1 | 12/2006 | Shoji et al. | |

FOREIGN PATENT DOCUMENTS

| | | |
|---|---|---|
| JP | 3610323 | 10/2004 |
| JP | 2005-17874 | 1/2005 |

OTHER PUBLICATIONS

U.S. Appl. No. 12/184,734, filed Aug. 1, 2008, Nakazato, et al.

* cited by examiner

*Primary Examiner* — Benny Q Tieu
*Assistant Examiner* — Juan Guillermety
(74) *Attorney, Agent, or Firm* — Oblon, Spivak, McClelland, Maier & Neustadt, L.L.P.

(57) ABSTRACT

An image forming apparatus includes a failure prediction unit, an image identification unit, a simulated-image generating unit, and an output unit. The failure prediction unit prepares an index value indicating a condition of the image forming apparatus based on multidimensional signal, obtained by monitoring the image forming apparatus, and compares the index value with a first threshold value to predict a failure mode of the image forming apparatus. The image identification unit identifies types of abnormal images based on the failure mode predicted by the failure prediction unit. An identified abnormal image is predicted to be appear a given time later. The simulated-image generating unit generates a simulated image of the identified abnormal image. The output unit outputs the identified abnormal image as the simulated image.

17 Claims, 13 Drawing Sheets

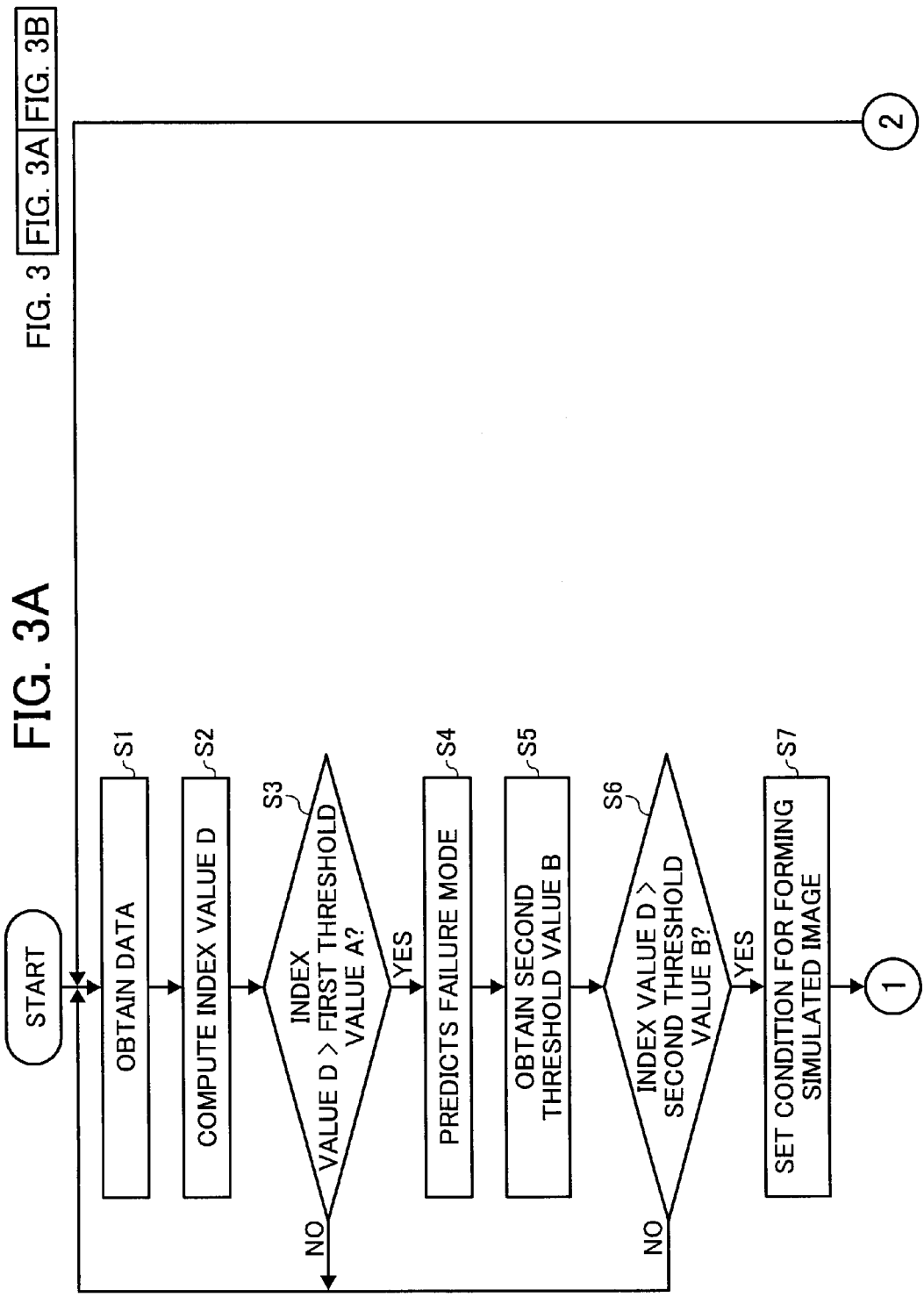

FIG. 4

IN TEN DAYS, PRESENTLY PRINTED IMAGE WILL BE PRODUCED.
IS IT ACCEPTABLE TO PRODUCE SUCH IMAGE?

SELECT A BUTTON

| ACCEPTABLE | UNACCEPTABLE |
|---|---|
| FROM NOW, FEE IS REDUCED FOR "XX %" FOR EACH SHEET. | IMAGE WILL BE PRINTED AT NORMAL QUALITY LEVEL. SERVICE PERSON WILL VISIT SOON. |

FIG. 5

IN TEN DAYS, PRESENTLY PRINTED IMAGE WILL BE PRODUCED.
IS IT ACCEPTABLE TO PRODUCE SUCH IMAGE?

SELECT A BUTTON

| ACCEPTABLE |
|---|
| FROM NOW, FEE IS REDUCED FOR "XX %" FOR EACH SHEET. |

FIG. 10A

| | FACTOR / ABNORMAL IMAGE | WHOLE FACE | | | MAIN SCANNING DIRECTION | | SUB-SCANNING DIRECTION | |
|---|---|---|---|---|---|---|---|---|
| | | DECREASED CONCEN-TRATION | TAINTED FACE | SPOTTY TAINTING | WHITE STRIPE | COLOR STRIPE | WHITE STRIPE | COLOR STRIPE |
| a | CHARGING POTENTIAL | | 1 | | | | | 1 |
| b | EXPOSED POTENTIAL | | | | 1 | | | |
| c | RESIDUAL POTENTIAL | 1 | | | | | | |
| d | TONER CONCENTRATION | | 1 | 1 | 1 | | | |
| e | TONER ADHERED AMOUNT | 1 | 1 | | | | | |
| f | DEVELOPING γ VALUE | 1 | 1 | | | | | |

| | TRANSFER CURRENT | DEVELOPING BIAS | LASER POWER | LASER POWER | LASER POWER | TRANSFER CURRENT | CHARGING CURRENT |
|---|---|---|---|---|---|---|---|
| g | | 1 | | | | | |
| h | | | | 1 | | | |
| j | 1 | | | | | | |
| k | 1 | | | | | | |
| m | | | | | | 1 | |
| n | | 1 | | | | | |
| ⋮ | | | | | | | |
| EXAMPLE PARAMETER FOR FORMING SIMULATED IMAGE | | | | | | | |

FIG. 13

| THRESHOLD VALUE CODE | FACTOR | | VALUE |
| --- | --- | --- | --- |
| 0001 | TM SENSOR DRIVE CURRENT | | * * * * |
| 0002 | FUSING TEMPERATURE CHANGE | | ○ ○ ○ ○ |
| 0003 | EXPOSED POTENTIAL | DEVELOPING γ VALUE | ☆ ☆ ☆ |
| 0004 | RESIDUAL POTENTIAL | TM SENSOR MINIMUM OUTPUT VALUE | × × × × |
| 0005 | DEVELOPING STARTING POTENTIAL | TONER CONCENTRATION | △ △ △ △ |
| 0006 | CHARGING POTENTIAL | TRANSFER BELT RESISTANCE VALUE | ★ ★ ★ |

# APPARATUS AND METHOD FOR GENERATING A SIMULATED IMAGE INCLUDING AN IDENTIFIED IMAGE ABNORMALITY

CROSS-REFERENCE TO RELATED APPLICATIONS

This application claims priority from Japanese Patent Application Nos. 2006-253404, filed on Sep. 19, 2006, and No. 2006-328433, filed on Dec. 5, 2006 in the Japan Patent Office, the entire contents of each of which are hereby incorporated by reference herein.

BACKGROUND OF THE INVENTION

1. Field of the Invention

The present disclosure relates to an apparatus, method, and a system for managing images produced by an image forming apparatus.

2. Description of the Background Art

Generally, an image forming apparatus needs maintenance work such as replacement of consumable supplies (e.g., toner, ink) and worn-out parts (e.g., photoconductor) or repair work in case of a malfunction.

The timing of such replacement of consumable supplies or worn-out parts may be determined not only by a number of sheets printed but also by other factors. For example, replacement of the photoconductor is mainly determined by how an operator (or user) uses the image forming apparatus over time. Therefore, the timing of such replacement needs to be determined for each operator or user individually.

In general, a frequency distribution of failed parts with respect to a time-to-failure (or a total number of printed sheets until apparatus failure) has a normal distribution curve. For example, replacement of parts may be determined when 10% of the product population fails (i.e., so called B10 life). However, it is undesirable to replace parts only by a factor of B10 life because the frequency distribution of failed parts may deviate from a normal distribution curve depending on certain other factors such as user-specific usage environment.

Generally, a user calls a service person when an image forming apparatus starts to produce images of unacceptable quality. Hereinafter, such unacceptable image may be referred to as an "abnormal image". In such a case, the user may need to wait for some time to be able to use the image forming apparatus again because the service person may need some time for the repair work. Accordingly, the user cannot use the image forming apparatus from a time of occurrence of an abnormal image to completion of repair work, which is inconvenient for the user.

Further, a service person may also feel inconvenience for such situation because the service person may need to visit a customer once such call is made by the customer. Such visit by-call system may make it increasingly difficult to make a plan for maintenance work by service person because it is difficult to predict when and where such abnormal image may occur in advance.

In view of such background, it is desirable to predict an image quality condition to be produced by an image forming apparatus in the near future (e.g., number of days, number of sheets to be printed). Such prediction may be correlated with the condition of parts such as the photoconductor, because a degradation level of parts may determine image quality condition to be produced in the near future.

If such image quality condition in the near future (e.g., number of days, number of sheets to be printed) can be predicted beforehand, a user can judge whether such image quality condition is acceptable or not acceptable before such image quality condition actually occurs.

For example, some users may not accept image quality of lower level to be produced in the near future, and other users may accept image quality to be produced in the near future because of desire to keep downtime of the apparatus to a minimum.

Accordingly, it is desirable to predict an image quality condition, failure mode, or degradation of image forming apparatus in the near future so that such condition information can be used to replace parts (e.g., photoconductor) at a better timing for each user.

Related art involves the application of methods to predict a failure mode by monitoring various condition information related to the image forming apparatus.

For example, reference data for a normal condition prepared in advance for the image forming apparatus is compared with detected information (or signals) to determine a normal/failure mode of apparatus. Specifically, an MT system using pattern recognition based on multivariate analysis technique may be used. Such MT system is known as Mahalanobis Taguchi method (MT method) or Mahalanobis Taguchi Adjoint method (MTA method), for example, and can be described as follows.

Sample data having normal condition for many factors are obtained to prepare a multidimensional space. Based on such multidimensional space, a distance between a to-be-evaluated data and a center of the multidimensional space is computed, wherein such distance is known as "Mahalanobis distance." A computing system may determine a to-be-evaluated data as a normal condition or a failure condition based on a length of such distance.

Further, another method has been applied to determine a maintenance timing of an image forming apparatus for each user, in which such image forming apparatus has a diagnostic unit to diagnose trouble of an image forming apparatus so that such trouble can be solved effectively and efficiently.

Such diagnostic unit receives diagnostic information from the image forming apparatus via a telecommunication line, and determines a plurality of methods how to cope with an apparatus condition corresponding to diagnostic information. The diagnostic unit transmits such plurality of methods to an apparatus (e.g., personal computer) of a user via the telecommunication line and displays such plurality of methods on a display unit with fee information for each method.

For example, such diagnostic information of a malfunctioning image forming apparatus (e.g., multi-functional apparatus) is transmitted to a customer center having a diagnostic unit via a telecommunication line, and fee information for each failure mode (or repair method) for each user can be estimated at the customer center. Such diagnostic information may be operating information of image forming apparatus, specification information of image forming apparatus, and remaining toner information, for example.

Examples of such repair method may be repair work by user, repair work by service person, or replacement of the apparatus as a whole, for example, and fee information for each repair method can be estimated at the customer center and transmitted to a user.

Accordingly, such system can provide information on a plurality of repair methods with related information (e.g., service, cost, days) for the malfunctioning image forming apparatus, by which a user can select a repair method. Such system may preferably provide services for repair methods depending on needs of each user.

Further, such system may provide maintenance service for each user based on condition information of an image forming apparatus, and a repair method determined based on an image pattern produced by the image forming apparatus.

For example, if an image pattern transmitted to a server of a customer center has defects, such as "sputtering (e.g., bleeding or blurred image)," it can be predicted that quality of toner has deteriorated, and a repair method suitable for such defected condition of image forming apparatus may be provided to a user.

However, such system can only provide certain types of repair methods to a user based on a determination process at a customer center of maintenance company, and moreover, such repair methods may be provided to a user with less consideration of a user-specific usage environment because a user's judgment on image quality may not be included in such determination process carried out by such system.

SUMMARY

The present disclosure relates to an image forming apparatus including a failure prediction unit, an image identification unit, a simulated-image generating unit, and an output unit. The failure prediction unit prepares an index value indicating a condition of the image forming apparatus based on multidimensional signal, obtained by monitoring the image forming apparatus, and compares the index value with a first threshold value to predict a failure mode of the image forming apparatus. The image identification unit identifies types of abnormal images based on the failure mode predicted by the failure prediction unit. An identified abnormal image is predicted to be appear a given time later. The simulated-image generating unit generates a simulated image of the identified abnormal image. The output unit outputs the identified abnormal image as the simulated image.

The present disclosure also relates to a method of managing images produced by an image forming apparatus including preparing, predicting, identifying, generating, and outputting. The preparing prepares an index value indicating a condition of the image forming apparatus based on multidimensional information, obtained by monitoring the image forming apparatus. The predicting predicts a failure mode of the image forming apparatus by comparing the index value with a first threshold value. The identifying identifies types of abnormal images to appear a given time later based on a predicted failure mode. The generating generates an identified abnormal image as a simulated image. The outputting outputs the simulated image of the identified abnormal image.

The present disclosure also relates to a computer program product stored on a computer readable storage medium for causing a computer to execute a method of managing images produced by an image forming apparatus, the computer program product including preparing, predicting, identifying, generating, and outputting. The preparing prepares an index value indicating a condition of the image forming apparatus based on multidimensional information, obtained by monitoring the image forming apparatus. The predicting predicts a failure mode of the image forming apparatus by comparing the index value with a first threshold value. The identifying identifies types of abnormal images to appear a given time later based on a predicted failure mode. The generating generates an identified abnormal image as a simulated image. The outputting outputs the simulated image of the identified abnormal image.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 4 shows an example screen shot having two buttons for accepting or not accepting simulated image;

FIG. 5 shows another example screen shot having one button for accepting or not accepting simulated image;

FIG. 10 is an example table illustrating a relationship of factors and abnormal images;

FIG. 13 shows an example table for historical data of threshold values.

Figure 1:
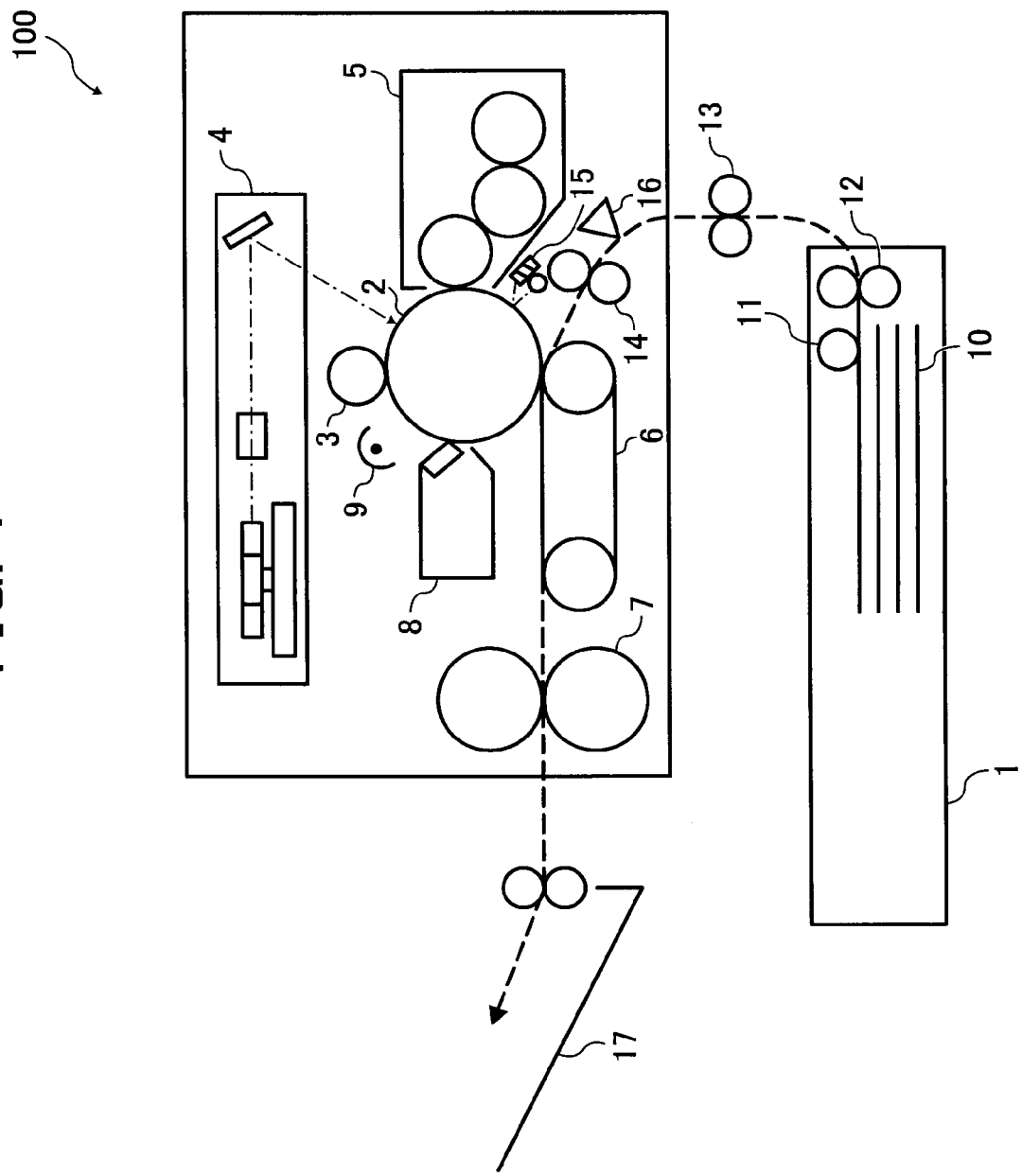
FIG. 1 shows a schematic cross-section view of an image forming apparatus according to an example embodiment.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

It will be understood that if an element or layer is referred to as being "on," "against," "connected to" or "coupled to" another element or layer, then it can be directly on, against connected or coupled to the other element or layer, or intervening elements or layers may be present. In contrast, if an element is referred to as being "directly on", "directly connected to" or "directly coupled to" another element or layer, then there is no intervening elements or layers present.

Like numbers refer to like elements throughout. As used herein, the term "and/or" includes any and all combinations of one or more of the associated listed items.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

Figure 2:
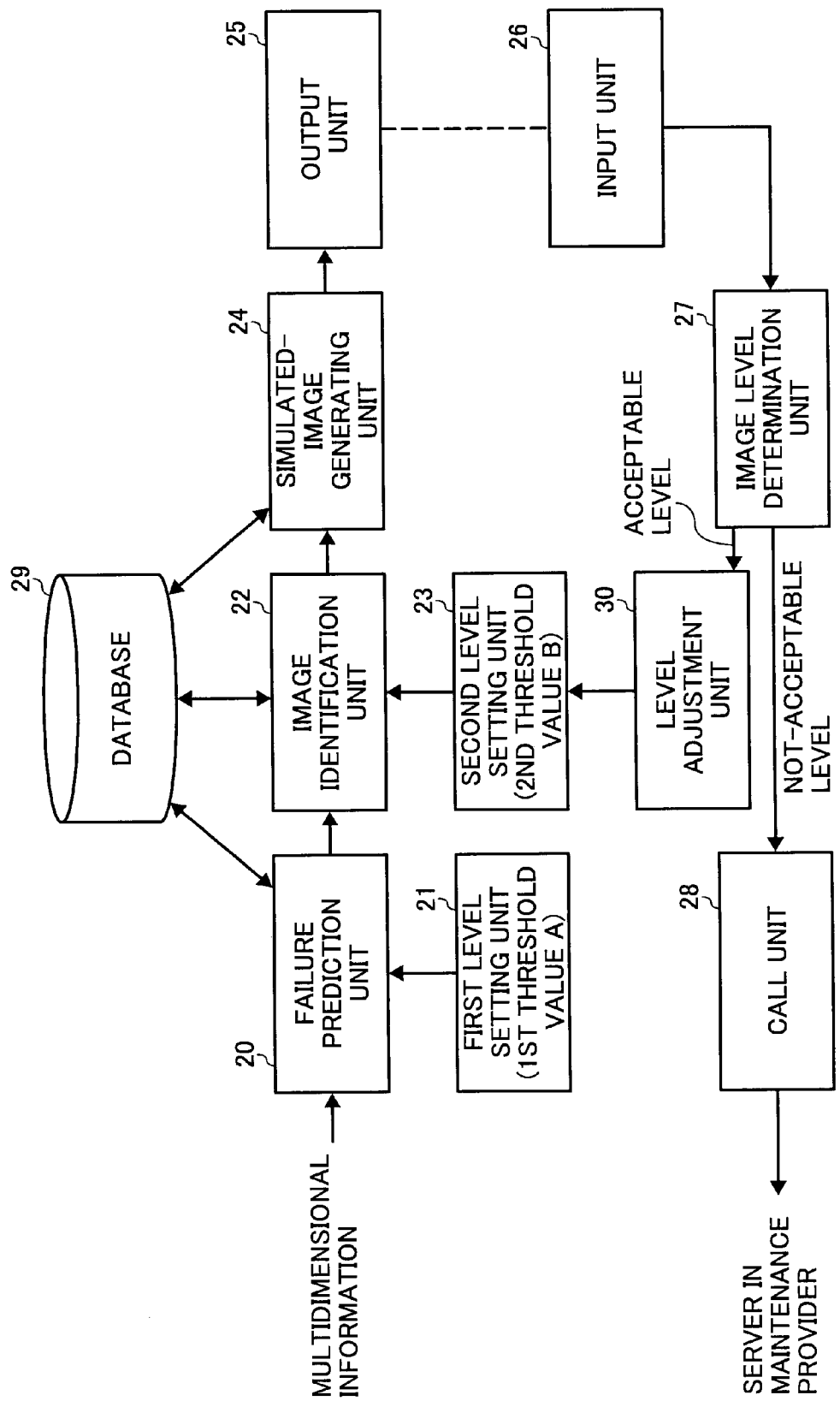
FIG. 2 shows a block diagram of a system for managing image quality according to an example embodiment.

Referring now to the drawings, wherein like reference numerals designate identical or corresponding parts throughout the several views, an image forming apparatus according to an example embodiment is described with particular reference to FIGS. 1 and 2.

FIG. 1 shows a schematic cross-sectional view of an image forming apparatus 100 according to an example embodiment. As shown in FIG. 1, the image forming apparatus 100 includes a sheet feed unit 1, a photoconductor drum 2, a charger 3, a developing unit 5, a transfer unit 6 (e.g., transfer charger), a cleaning unit 8, a de-charger 9, and a fusing unit 7 to conduct an image forming operation by electrophotography, for example.

In the image forming apparatus 100, an electrostatic latent image is formed on the photoconductor drum 2 by irradiating a light beam on the photoconductor drum 2 based on a document image scanned by a scanner (not shown).

In the image forming apparatus 100, a recording sheet 10 stacked in the sheet feed unit 1 is transported to a position facing a registration sensor 16 with a feed roller 11 and transport rollers 12 and 13.

Then, the registration sensor 16 detects a front end of the recording sheet 10, and registration rollers 14 feeds the recording sheet 10 to a nip portion defined by the photoconductor drum 2 and the transfer unit 6 by adjusting a sheet feed timing and a sheet orientation of the recording sheet 10. The transfer unit 6 is used to transfer a toner image from a surface of the photoconductor drum 2 to the recording sheet 10.

After transferring the toner image on the recording sheet 10, the fusing unit 7 fixes toner image on the recording sheet 10, and then the recording sheet 10 is ejected to a tray 17.

The image forming apparatus 100 produces an image as follows.

First, the charger 3 uniformly charges the photoconductor drum 2. An optical writing unit 4 irradiates a light beam on the charged photoconductor drum 2 based on an image signal to form an electrostatic latent image on the photoconductor drum 2. The developing unit 5 supplies toner to the electrostatic latent image to develop toner image on the photoconductor drum 2.

A process sensor 15 having a light emitting element and a light receiving element monitors such toner image formed on a surface of photoconductor drum 2 to obtain information related to a surface condition of the photoconductor drum 2, for example.

The transfer unit 6 transfers the toner image from the photoconductor drum 2 to the recording sheet 10. After transferring the toner image to the recording sheet 10, the cleaning unit 8 removes toner remaining on the photoconductor drum 2, and then the de-charger 9 de-charges the photoconductor drum 2 to prepare for a next image forming.

The de-charger 9 may include a lamp, disposed in a direction parallel to an axial direction of the photoconductor drum 2. A light beam irradiated on the photoconductor drum 2 by the de-charger 9 reflects on the photoconductor drum 2, and such reflected light enters a CCD (charge coupled device) sensor of a first reflection light sensor (not shown).

Further, a light beam irradiated on the photoconductor drum 2 by the optical writing unit 4 reflects on the photoconductor drum 2, and such reflected light may enter a CCD (charge coupled device) sensor of a second reflection light sensor (not shown).

The process sensor 15 uses a reflection light reflected from the photoconductor drum 2 to obtain information related to conditions of the photoconductor drum 2, wherein such reflection light may be obtained when the photoconductor drum 2 is exposed with a light beam, and when the toner image is developed on the photoconductor drum 2, for example. Such information related to conditions of the photoconductor drum 2 may be an amount of toner adhered on the photoconductor 2, toner concentration, or the like, for example.

Although not shown, an operating information sensor can obtain information such as total operating time of the image forming apparatus, a number of printed sheets, a number of replacing times of toner cartridge, a number of replacing times of photoconductor drum, or the like, for example.

Further, power information (e.g., charging potential, exposing potential) of electron beam, transfer potential, developing potential may be obtained.

Further, a TM sensor, which is a reflection type sensor, detects an image concentration of image pattern formed on a transfer belt to obtain information used for adjusting concentration level and aligning positions of each color image, for example.

A description is now given for an image management system for the image forming apparatus 100 with reference to FIG. 2.

As shown in FIG. 2, an image management system includes a failure prediction unit 20, an image identification unit 22, and a simulated-image generating unit 24, for example.

The failure prediction unit 20 obtains multidimensional information of the image forming apparatus 100 from sensors disposed in the image forming apparatus 100. The image identification unit 22 identifies types of abnormal image based on a failure mode determined by the failure prediction unit 20. The simulated-image generating unit 24 generates a simulated image corresponding to an abnormal image identified by the image identification unit 22.

As shown in FIG. 2, the image management system further includes a first level setting unit 21, and a second level setting unit 23, for example.

The first level setting unit 21, coupled to the failure prediction unit 20, stores a first threshold value A (refer to FIG. 9) for determining a level of failure mode. The first threshold value A may be set to a value, which corresponds to a lowest acceptable image quality, which may be set by a manufacturer when to ship an apparatus from a factory, for example. If an actual value becomes worse than the first threshold value A, a human eye can recognize a degradation of image quality produced on a recording medium.

Figure 9:
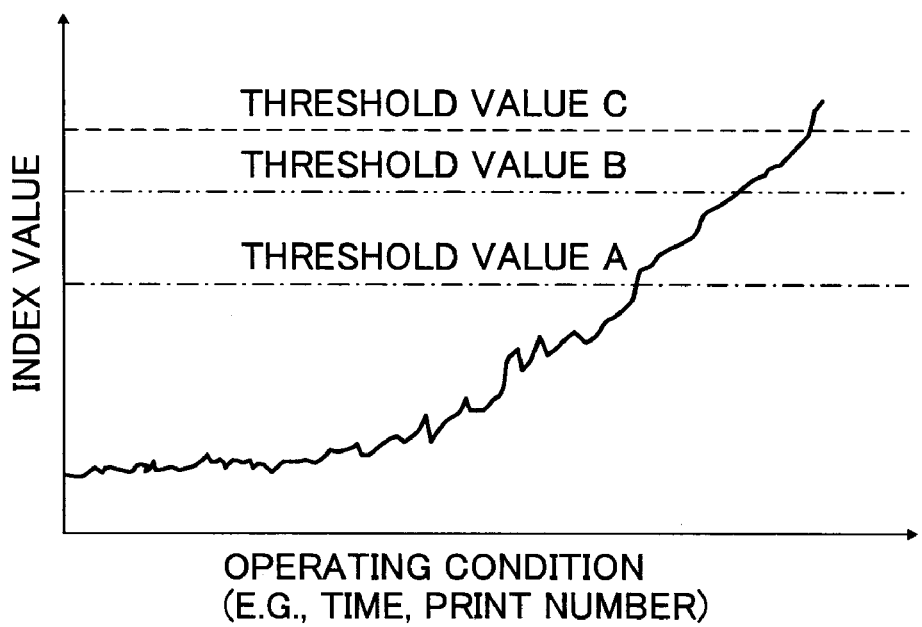
FIG. 9 is a graph illustrating a relationship of an index value and threshold values, in which the threshold values is changeable.

The second level setting unit 23, coupled to the image identification unit 22 and a level adjustment unit 30, stores a second threshold value B (refer to FIG. 9). The second threshold value B is settable or changeable by an operator (or user), for example.

Further, as shown in FIG. 2, the failure prediction unit 20, the image identification unit 22, and the simulated-image generating unit 24 are coupled to a database 29, wherein the database 29 stores historical information or data of the image forming apparatus 100, wherein historical information or data may include operation information of image forming apparatus 100 from past to present time.

Specifically, the database 29 may store information such as apparatus condition information for a given period of time, which may be used for computing index values, discriminant for computing index values, threshold value data, for example.

Further, the database 29 may store a table relating factors and abnormal images (FIG. 10), data for relating image ranking levels and index values (FIG. 8), parameter adjusting data for abnormal image (FIG. 11), and historical data for failure modes (FIG. 13), for example.

Based on data stored in the database 29, the failure prediction unit 20, the image identification unit 22, and the simulated-image generating unit 24 conducts computing of index values, identification of types of abnormal images, and generation of simulated image, which will be described later.

The database 29 stores following information as factor (or condition) information for computing index values. However, such factor information is not limited to following example information.

Such factor may be: charging potential, which is a photoconductor potential after charging; exposed potential, which is photoconductor potential after exposing; residual potential, which is photoconductor potential after decharging; toner concentration, which is an amount of toner in a developing area defined with a photoconductor and a developing unit (in case of two-component developer); toner adhered amount, which is an amount of toner adhered on a unit area of latent image on photoconductor; developing y value, which is a gradient coefficient of a line defined based on a relationship of a potential difference of photoconductor potential and developing potential and an amount of adhered toner; developing starting potential, which is the x intercept of the line for the developing y; TM sensor drive current, which is a current for light emitting element of TM sensor; TM sensor minimum output value, which is a minimum output of TM sensor corresponding to a maximum sensitivity of TM sensor, used to obtain condition information of a monitored object; transfer belt resistance value, which is a resistance value of transfer belt; drive motor current, which is a current amount for driving a motor; and fusing temperature change, which is a temperature change of fusing unit.

Based on multidimensional information obtained by sensors disposed in the image forming apparatus 100, the failure prediction unit 20 generates index values indicating various conditions of the image forming apparatus 100, and compares such index values with the first threshold value A, received from the first level setting unit 21. A computing method of index value will be described later.

The index value is a value, which is used to predict an apparatus condition in a given time later. If the computed index value becomes worse than the first threshold value A, a failure mode may be predicted.

When the computed index value is determined to be worse than the first threshold value A, the image identification unit 22 selects and retrieves data of specific factor(s) stored in the database 29 to identify types of abnormal images. An identification method of abnormal images will be described later.

Such types of abnormal images may have many types as described later with FIG. 10, for example.

As above mentioned, the simulated-image generating unit 24 generates a simulated image corresponding to the identified abnormal image. Such "simulated image" may mean an abnormal image, which is to be produced in a given time later if an image forming operation is conducted under a condition predicted by the index value.

Such simulated image can be generated based on a user-specific usage. For example, a user may select an image sample data, which is actually used by the user, and input data of the image sample to the image forming apparatus by scanning the image sample. Based on such image sample, a simulated image (or abnormal image), which may be produced in a given time later, can be output. Such output-simulated image may be useful for the user because a to-be-happen abnormal image can be recognized with the image sample, which is actually used by a user.

Such simulated image generated by the simulated-image generating unit 24 is transmitted to an output unit 25, and the output unit 25 prints out such simulated image on a sheet such as transfer sheet.

A user can check an output result (i.e., simulated image) printed by the output unit 25 to determine whether such simulated image is within an acceptable level for the purpose of user.

Such user inputs a judgment result of acceptable or not-acceptable to an input unit 26 of the image forming apparatus 100, and the input unit 26 outputs such judgment result to an image level determination unit 27 shown in FIG. 2.

The input unit 26 has a display unit to display messages, which is transmitted from the image management system. For example, the display unit of the input unit 26 displays messages shown in FIG. 4 after a simulated image is printed with the output unit 25. Specifically, the display unit displays a message such as "In ten days, presently printed image will be produced. Is it acceptable to produce such image? Select a button," and also displays an "Acceptable" button and an "Unacceptable" button below the message, for example.

Further, as shown in FIG. 4, the "Acceptable" button is provided with a message such as "From now, fee is reduced for xx % for each sheet," and the "Unacceptable" button is provided with a message such as "Image will be printed at normal quality level. Service person will visit soon."

Instead of example screen shot shown in FIG. 4, an "Acceptable" button alone may be displayed as shown in FIG. 5. If such "Acceptable" button is not pressed within a given time (e.g., 1 minute), the image management system may automatically determine that such an simulated image is not "unacceptable" for a user, and inform such condition to a server of a maintenance service provider, for example.

Further, the output unit 25 can print simulated images having a plurality of image quality levels. For example, as shown in FIG. 7, simulated images having a three levels such as level K (a little bad), level L (bad), level M (too bad) can be printed on one sheet. In such a case, messages to be displayed on a display unit may be changed as shown in FIG. 6, which shows another example screen shot for messages corresponding to simulated images shown in FIG. 7.

Figure 6:
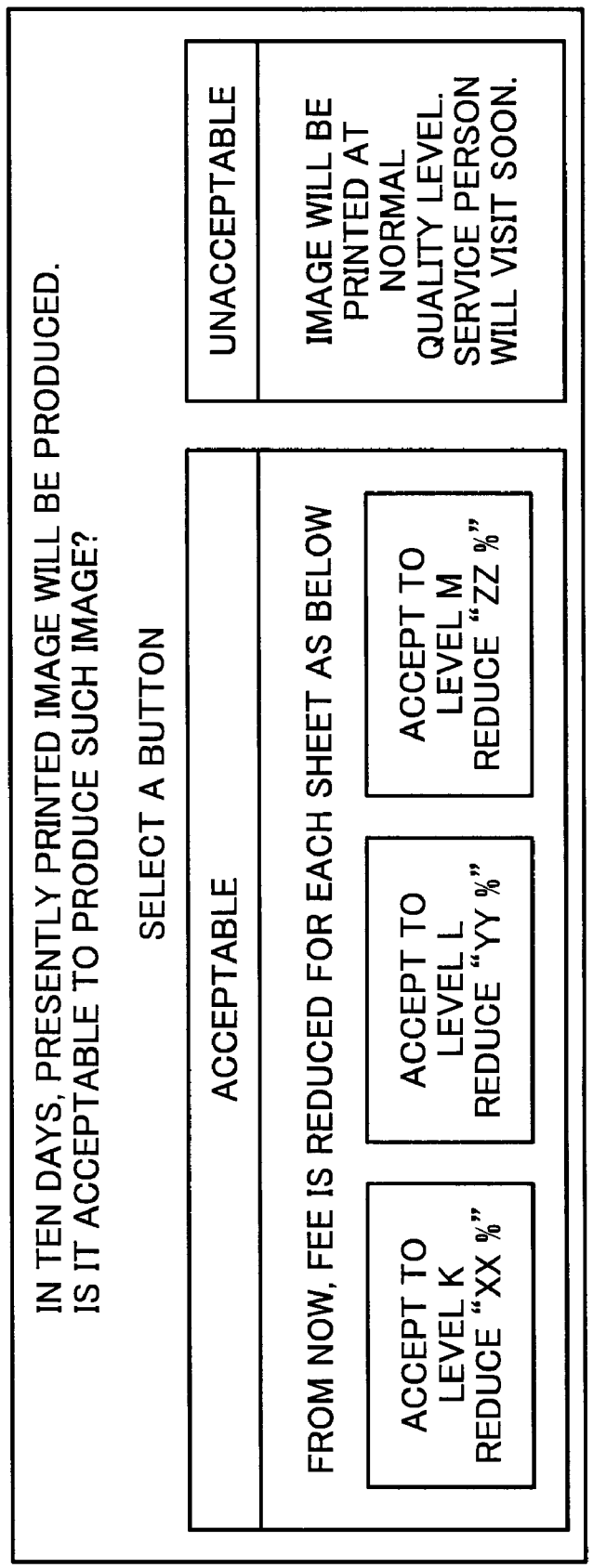
FIG. 6 shows another example screen shot having two buttons for accepting or not accepting simulated image quality, in which simulated image quality is ranked in different levels.
Figure 7:
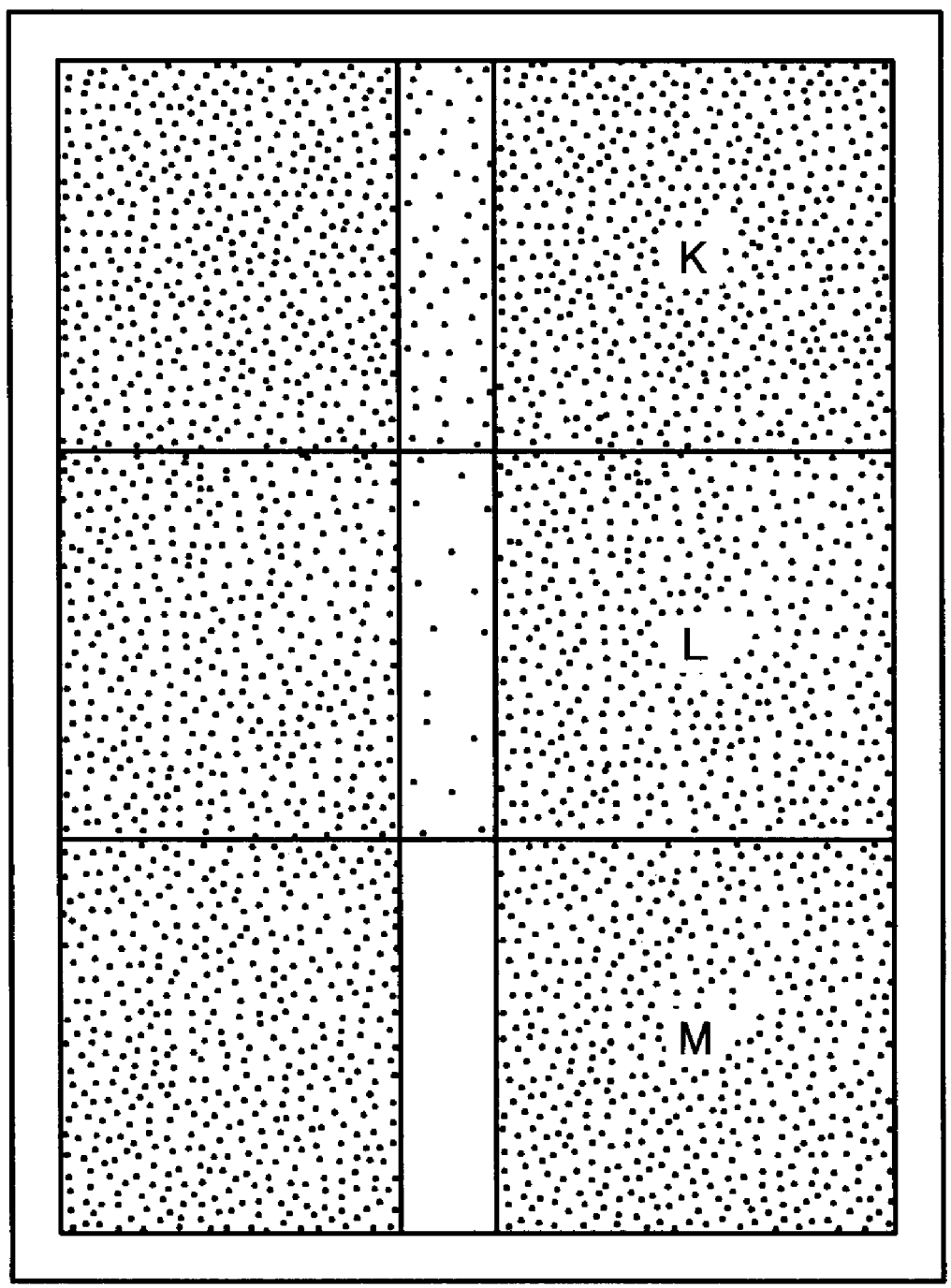
FIG. 7 shows a schematic view of one sheet printed with simulated images having different levels of image quality.

In FIG. 6, an "Acceptable" button is provided with a message such as "From now, fee is reduced for each sheet as follows: If level K is accepted, fee is reduced by xx %; if level L is accepted, fee is reduced by yy %; if level M is accepted, fee is reduced by reduced by zz %.

As shown in FIG. 7, because abnormal images of three levels of K, L, and M are output on one sheet, a user can select one acceptable level from such abnormal images produced on one sheet.

If each of three levels of abnormal images is printed separately on different sheets (e.g., three sheets), a user may have to conduct a judgment of accepting or not-accepting of abnormal images (or simulated image) for each level printed on different sheets (e.g., three times of judgment when abnormal images have three quality levels), which is an inconvenient process for a user.

In an example embodiment, because abnormal images of three levels of K, L, and M are output on one sheet, and a user can select one acceptable level from such abnormal images, a user can conduct a judgment of accepting or not-accepting of simulated image at one time, and such judgment is transmitted to a maintenance service provider (or service person) once the user inputs a judgment result on simulated images, which is a convenient process for a user.

Further, each level of simulated image may be provided with fee/charge information, which informs a fee for normal image and a fee for abnormal image, for example. Based on such fee/charge information, a user can select an acceptable level of image depending on needs of user.

Although FIG. 7 shows the simulated image as halftone images, other images having plurality of levels may be printed on a sheet depending on a usage of user. For example, a plurality of levels of character bleeding (e.g., three levels), a plurality of levels of white stripe or color stripe may be printed on a sheet. Further, as above-mentioned, such simulated image can be generated based on a user-specific usage.

Accordingly, a user can see and compare image quality having plurality of levels (e.g., different image quality is shown gradationally or step-by-step) on one sheet, with which a user can easily judge an acceptable level of image quality depending on needs of user.

Such acceptable level selected by a user is transmitted from the input unit 26 to the image level determination unit 27. The image level determination unit 27 outputs signals corresponding to signals transmitted from the input unit 26, which indicates that a simulated image is acceptable or not acceptable.

If the user inputs a judgment result of "acceptable" with the input unit 26, such "acceptable" information is transmitted to the level adjustment unit 30 via the image level determination unit 27, and then the user may relax the second threshold value B.

For example, as illustrated in FIG. 9, the threshold value may be changed in a direction from the threshold value B toward the threshold value C with a decision of a user if a user can accept an image quality having a relatively lower quality compared to a normally produced image. Furthermore, Such changed second threshold value B is transmitted to the second level setting unit 23, and the image identification unit 22 uses such changed second threshold value B as a new second threshold value when to identify quality level of images to be produced.

Further, if the image level determination unit 27 receives a judgment result from the input unit 26 that image quality of simulated image is "unacceptable" for user, such judgment information (i.e., unacceptable information) is transmitted to the call unit 28, and further transmitted a server (not shown) in a maintenance service provider via a network (not shown) to request a visit of service person.

Figure 3B:
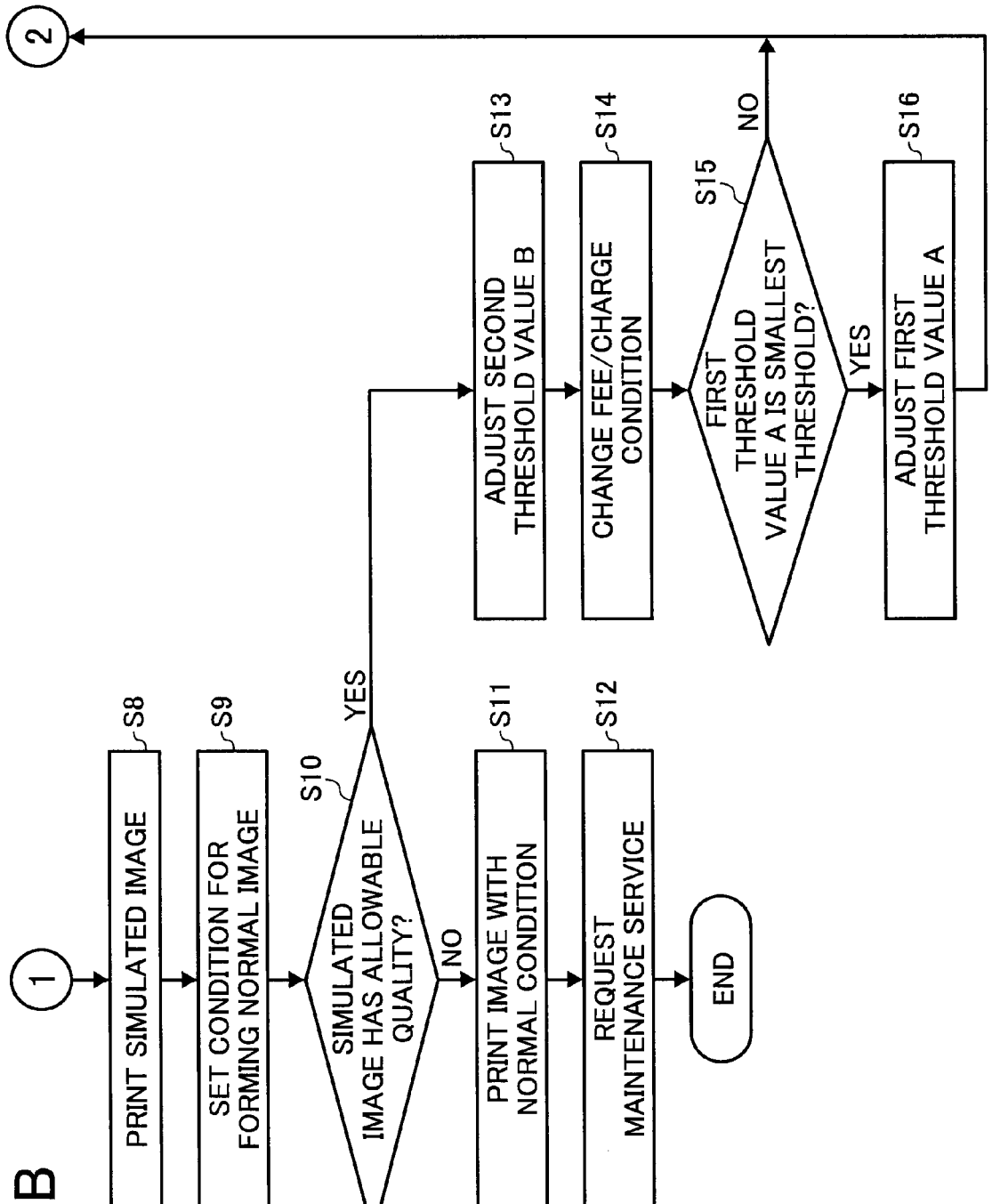
FIG. 3 shows a flow chart for illustrating a process of managing image quality according to an example embodiment.

A description is now given to a process of image management with reference to a flow chart of FIG. 3.

In step S1, multidimensional information or data such as sensor information and apparatus operating information indicating an apparatus condition of the image forming apparatus 100 is obtained, and is stored in the database 29.

Such sensor information may be information, which is obtained by sensors (refer to FIG. 1) disposed in the image forming apparatus 100 such as amount of toner adhered on photoconductor, toner concentration, power of electron beam (e.g., charging potential, exposing potential), a transfer potential, and a developing potential, for example.

Further, such operating information may be information such as total operating time of image forming apparatus, a number of printed sheets, a number of replacing times of toner cartridge, and a number of replacing times of photoconductor drum, but not limited such information. Such operating information will be described later with reference to FIG. 10.

In step S2, the failure prediction unit 20 computes an index value D based on multidimensional data obtained in step S1. Such index value D is computed based on data obtained in a given past time period and data obtained at present time in step S1. Such index value D is used to predict a condition of the image forming apparatus 100 in a given time later.

In step S3, such computed index value D is compared with the first threshold value A set in advance, wherein the first threshold value A is generated in the first level setting unit 21 shown in FIG. 2. Based on such comparison, a condition of the image forming apparatus 100 in a given time later is determined.

If the index value D is determined to be smaller than the first threshold value A in step S3 (No in step S3), the process goes back to step S1.

On one hand, if the index value D is determined to be greater than the first threshold value A in step S3 (Yes in step S3), the image identification unit 22 identifies types of abnormal images in step S4.

In step S4, a failure mode is predicted based on factors selected and retrieved from the database 29, which will be described later.

In this disclosure, an index value smaller than a given threshold value may indicate that an image to be produced in a given time later is acceptable for a user, and an index value greater than a given threshold value may indicate that an image to be produced in a given time later is unacceptable for a user.

When a failure mode is predicted or identified in step S4, the second threshold value B is obtained in step S5. The second threshold value B can be prepared in advance, or a user can set the second threshold value B. Such second threshold value B has a relaxed value compared to the first threshold value A. In other words, the second threshold value B is set greater than the first threshold value A. Accordingly, the first threshold value A and second threshold value B can be set to different values.

Further, the first threshold value A and the second threshold value B can be set to a same value as initial setting condition for apparatus, as required.

In an example embodiment, the image management system has a configuration to relax the second threshold value B as above mentioned. However, the image management system can have a configuration to set the second threshold value B to a more strict value (e.g., a value closer to the first threshold value A).

In step S6, the index value D is compared with the second threshold value B obtained in step S5.

If the index value D is determined to be smaller than the second threshold value B in step S6 (No in step S6), the process goes back to step S1.

On one hand, if the index value D is determined to be greater than the second threshold value B in step S6 (Yes in step S6), a type of abnormal image is identified based on the failure mode predicted selected in step S4. An identification process of types of abnormal images will be described later. If the index value D is determined to be greater than the second threshold value B in step S6 (Yes in step S6), the simulated-image generating unit 24 sets conditions for forming a simulated image in step S7.

In step S8, the image forming apparatus 100 prints out a simulated image with the conditions set by the simulated-image generating unit 24. After printing the simulated image in step S8, an image forming condition changed in step S7 is reset to a condition for forming a normal image in step S9.

In step S10, a user checks a printed simulated image to judge whether such simulated image has an image quality which is acceptable or not-acceptable for the user, and input a judgment of acceptable or not-acceptable of simulated image. As above described, such judgment on simulated image is conducted with a display unit (e.g., display panel) of the input unit 26 shown in FIGS. 4, 5, and 6, for example.

If the user judges that the simulated image is unacceptable in step S10 (No in step S10), the image forming apparatus 100 conducts a print job with a normal condition in step S11, and in step S12, a maintenance service is requested to a server in a maintenance service provider.

The above-described process can be conducted before an actual failure mode occurs in the image forming apparatus 100. Accordingly, a service person of maintenance service provider can make a plan for maintenance service with a sufficient lead time, which may be convenient for the maintenance service provider for scheduling a working sift of service persons.

On one hand, if the user judges that the simulated image is acceptable and a reduced fee is preferable for the user in step S10 (Yes in step S10), the user adjusts the second threshold value B to or toward a third threshold value C (refer to FIG. 9), which is less demanding than the threshold value B, in step S13, and in step S14, a fee condition is changed to a condition of "fee is reduced by xx %."

FIG. 9 shows an example relationship of the first threshold value A, the second threshold value B, and the third threshold value C. The horizontal axis represents operating condition (e.g., clock time, operating time, print number), which is used for predicting failure modes, and the vertical axis represents index values.

Figure 8:
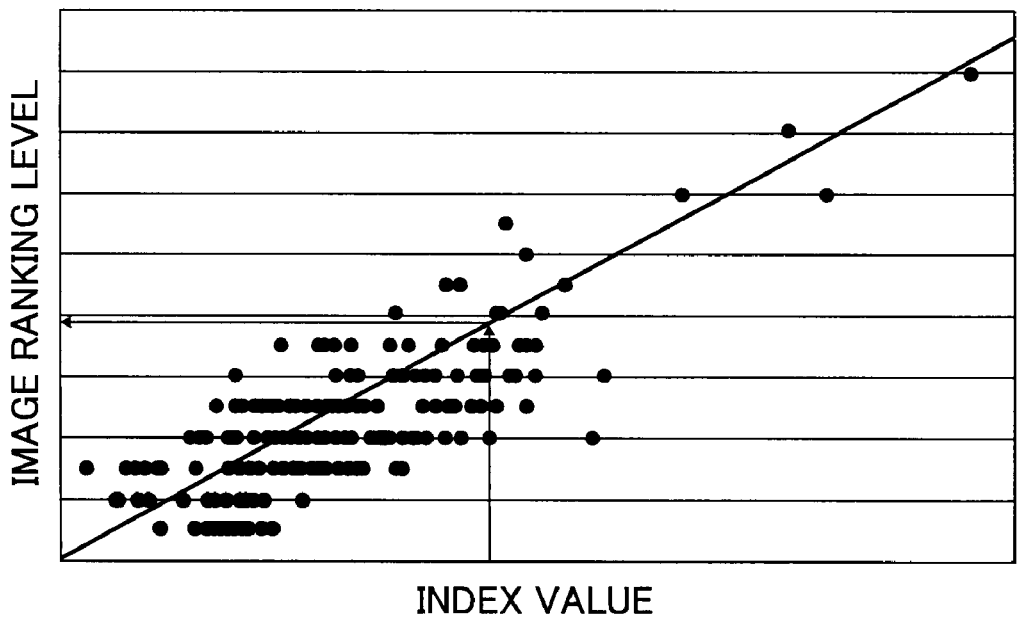
FIG. 8 is a graph illustrating a relationship of an image ranking level and an index value obtained by experiments.

In FIG. 8, the greater the index value, the worse the image quality (i.e., image ranking level becomes lower). In other words, the index value is a value of "the smaller the better" value.

In FIG. 9, the first threshold value A is the most demanding threshold value, because it has a smaller allowable range of acceptable image levels and a higher image ranking quality level, and the third threshold value C is the least demanding threshold value, because it has a larger allowable range of acceptable image levels and a lower image ranking quality level. The second threshold value B is set between the first threshold value A and the third threshold value C.

In step S15, it is determined whether the first threshold value A is smaller than the second threshold value B changed in step S14. As shown in FIG. 9, the first threshold value A is set as the smallest value. After confirming the first threshold value A is the smallest value in step S15, the first threshold value A may be changed in step S16. If the first threshold value A is changed in step S16, such changed first threshold value A is used in step S3 as a new first threshold value A.

A description is now given of a computing method of index value D.

Based on multidimensional information (e.g., sensor information, operating information), indicating condition of the image forming apparatus 100 and stored in the database 29, a multidimensional space having coordinate axis for a plurality of information is defined. A distance of present value of each information is computed in such multidimensional space. Such distance becomes an index value D. Based on such index value D, a failure mode of apparatus or an image ranking level in a given time later can be determined.

FIG. 8 shows a relationship of index values and image ranking levels based on data obtained from a plurality of image forming apparatuses, wherein the data is obtained by the above-described computing method. Based on such experiment data, it was confirmed that the greater the index value, the worse the image ranking level. Although some variation may be observed on experiment data of index values and image ranking levels, the image ranking level and index value may have a proportional relationship as a whole. In general, a value of image ranking level may be a discrete value, but a non-discrete value such as concentration value can be used.

A description is now given for a process of predicting failure mode.

(1) Compute an index value by using all factors to be used for computing the index value, wherein such factors may be stored in the database 29.

(2) By reducing a factor one by one, compute an index value for each factor.

(3) By comparing index values computed in (2), select factors, which can increase index value. In other words, select factors having a relatively greater contribution to an increase of index value.

(4) Refer to a table (FIG. 10) relating factors with abnormal image, and predict a failure mode for the selected factors. For example, if a selected factor is "charging potential," a failure mode prediction may become "whole face/tainted face" and "color stripe in sub-scanning direction."

Such method is one example for a process of predicting failure modes. Instead of such method, the index value can be computed with factors, which are combined by using an orthogonal table of two-level factors.

Such orthogonal table is a table for combining conditions, which is used in DOE (design of experiment). Such orthogonal table can save a number of experiment times and obtain a reliable result on signal to noise ratio (S/N).

For example, if five types of parameters are selected, and each type has three levels, a number of experiment times to be conducted by a conventional method becomes $3^5=243$ times to obtain data for a better conditioning of apparatus.

However, by using the orthogonal table, such number of experiment times can be reduced effectively. Further, because noise information is included in each experiment, a reliable result can be obtained. When a research and development stage is conducted, such orthogonal table can be used to select parameters, which may cause a greater change of index value when an apparatus is operated in an actual condition, and eliminate parameters, which may not cause a greater change of index value. As such, such orthogonal table can save a number of experiment times and obtain a reliable result.

FIG. 10 shows a table relating factors and types of abnormal images, which may be stored in the database 29. In FIG. 10, twelve factors of (a) to (n) are selected, for example, but other sensor information or factors can be selected. FIG. 10 shows a matrix of selected factors along the vertical direction, and types of abnormal images along the horizontal direction.

In FIG. 10, a flag information "1" indicates that a factor and a type of abnormal image have a relationship each other. Such information is obtained by experiment or product evaluation, for example.

In FIG. 10, types of abnormal images may be three types of abnormal image for whole face, two types (e.g., white stripe and color stripe) of abnormal image for a main scanning direction and a sub-scanning direction.

In case of whole face, the decreased concentration may mean a fainted character or image, and the tainted face may mean dirty image on a whole face.

Such decreased concentration may be related to degradation of residual potential (c), toner adhered amount (e), developing Y value (f), TM sensor minimum output value (j), and transfer belt resistance value (k), for example.

Further, such tainted face may be related to charging potential (a), toner concentration (d), toner adhered amount (e), developing Y value (f), developing starting potential (g), TM sensor drive current (h), TM sensor minimum output value (j), and fusing temperature change (n), for example.

Further, spotty tainting may mean a dirty image caused by a circular shape of recording agent dropped on sheet, and may be related to toner concentration (d), for example.

Further, a white stripe in main scanning direction may be related to exposed potential (b) and toner concentration (d), and a color stripe in main scanning direction may be related to developing starting potential (g) and TM sensor drive current (h), for example.

Further, a white stripe in sub-scanning direction may be related to drive motor current (m), and color stripe in sub-scanning direction may be related to charging potential (a) and drive motor current (m), for example.

A description is now given to a process for setting condition for forming a simulated image (i.e., abnormal image).

(1) Identify types of abnormal images corresponding to factors selected in FIG. 10. For example, when the charging potential is selected, a tainted face in whole face and a color stripe in sub-scanning direction is identified.

(2) Refer to parameters, which can be used for generating the simulated image corresponding to the identified abnormal images. For example, in case of charging potential, developing bias potential and charging current may be used as parameters.

Figure 11:
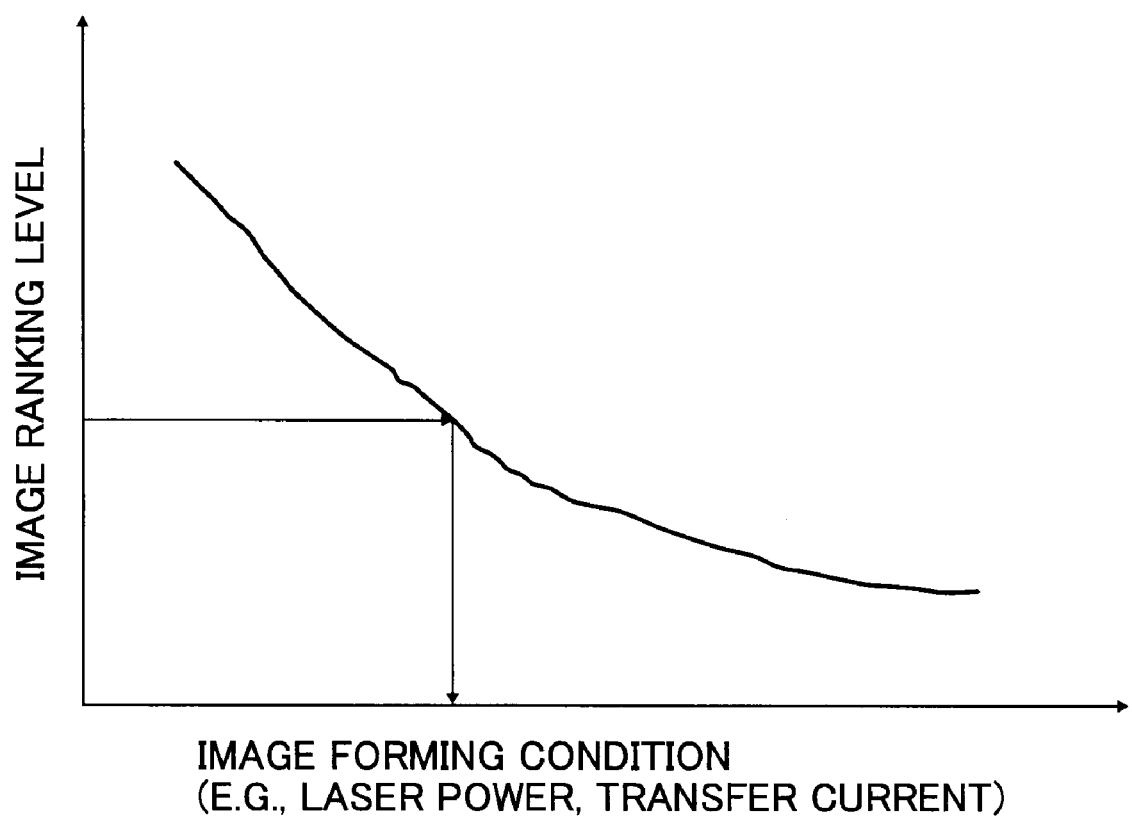
FIG. 11 is a graph illustrating a relationship of level of abnormal images and image forming conditions.

(3) Set a value to the parameter referred in (2) based on a parameter adjusting data shown in FIG. 11, which is used to set a value of parameter used for forming abnormal image as simulated image.

FIG. 11 shows a parameter adjusting data for abnormal image, which shows a relationship between image ranking level (or index value D) along the vertical axis and each parameter value for image forming condition along the horizontal axis. Based on such relationship shown in FIG. 11, a value of image forming condition corresponding to an image ranking level (or index value D) can be determined.

Such relationship of image ranking level and image forming condition can be obtained in research and development stage, and becomes a basic data for configuring a relationship of factors and types of abnormal image shown in FIG. 10. Further, such relationship is used for generating simulated image. Such image forming condition is not limited laser power, transfer current (shown in horizontal axis), but other factors shown in FIG. 10 can be included in the image forming condition.

Figure 12:
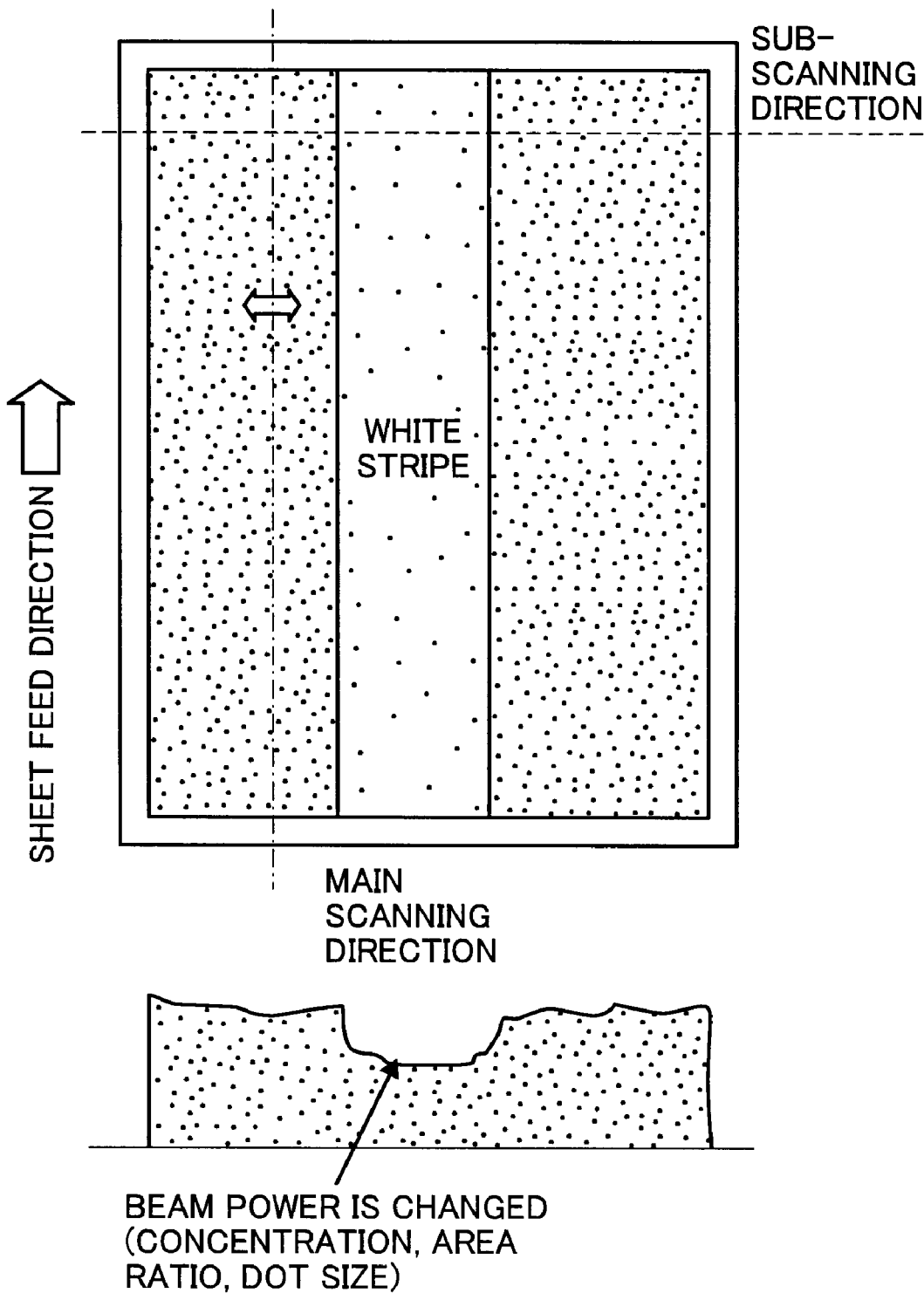
FIG. 12 shows a schematic view of one sheet having a simulated abnormal image generated based on predicted condition of abnormal image.

A description is now given of a method of generating simulated image based on image forming condition, which is selected as above described. FIG. 12 shows a simulated image corresponding to an identified abnormal image having a white stripe.

In FIG. 12, halftone images are used for simulated image for the simplicity of illustration as similar to FIG. 7, but simulated image other than halftone images can be used depending a user-specific usage.

A white stripe image in a vertical direction in FIG. 12 can be formed by decreasing concentration or by using size-reduced dots in a narrow area.

In the image forming apparatus 100 using laser or LED (light emitting diode), light intensity can be controlled in multiple steps to obtain a relatively greater range of gradation. Accordingly, by setting a light intensity of light beam at a smaller value, an abnormal image of white stripe may be generated because such lower beam power generates a lower level of gradation. Further, such white stripe may be formed by reducing a light emitting time (or duty time) in case of a reversal development method.

Alternatively, by enlarging light intensity gradation range by controlling a light intensity range, or by increasing an exposing time (or duty time) for optical writing process, an abnormal image can be also effectively generated. Further, although not shown, stripe image in lateral direction can be generated by reducing or increasing dot size, and changing dot interval. Further, an abnormal image in sub-scanning direction can be generated by setting image forming condition such as beam power, charging potential, developing potential, and transfer current at a given level. Such image forming condition may be prepared based on samples of abnormal image obtained by experiments or the like.

As shown in FIG. 13, a historical data table relating threshold values, index values, selected factors, types of abnormal image can be stored for the image forming apparatus 100. For example, such historical data table may be stored in the database 29.

Furthermore, such historical data can be used or transplanted to a new image forming apparatus when replacing an old one with new one.

Because one specific user may use a plurality of image forming apparatuses in a similar manner, if such historical data having factors and threshold values, acceptable for such specific user, is used for the image forming apparatus 100, and if such historical data is reused for an new image forming apparatus when replacing an old one with new one, such data may be used usefully for setting a maintenance timing for new image forming apparatus.

In FIG. 13, a threshold value code "0001" is influenced by "TM sensor drive current" and "developing starting potential," and a threshold value is changed to a value of "xxxx." Similarly, a threshold value code "0002" is influenced by "fusing temperature change," and a threshold value is changed to a value of "oooo". Other threshold value codes shown in FIG. 3 can be similarly described.

In an example embodiment, such historical data used in the image forming apparatus 100 can be transferred or transplanted to another image forming apparatus via network or removal memory medium, for example. Further, such historical data can be printed on a sheet as text data. Such text data can be scanned by an OCR (optical character reader), and then transplanted other image forming apparatus.

Such historical data can be transplanted when a user installs a new apparatus or replaces old apparatus with a new apparatus, by which such user may not need to set an image management conditioning for such new apparatus, which is convenient of reducing a workload by user.

Further, because such text data can be checked by a user, which may not be possible with electronic data invisible to human eye, the user may be convinced how an maintenance work is conducted for apparatus.

As such, a maintenance work can be conducted at a better timing for each user based on a failure mode prediction, a judgment on abnormal image types, which may be customized for each user.

Further, each part of apparatus may be used until its lifetime by using the above-described image management system, by which a resource saving can be enhanced. Further, because a plurality of levels of simulated images can be seen by a user, a user can select an acceptable level with one judgment action such as touching a key on a display unit, by which a user can select an acceptable image quality easily.

Further, because a user can compare several abnormal images to be appearing in the near future at one time, a user can judge a level of abnormal images correctly. Further, because a plurality of abnormal images can be printed on one sheet, a consumption of transfer sheets can be reduced.

Further, because historical data can be transplanted to other apparatus, many apparatus can be operated in a similar manner based on an image management conditioning on one image forming apparatus, by which a user may not need to repeat a same image management conditioning to other apparatuses, which is preferable for reducing workload of user.

Further, because historical data on one apparatus can be commonly used for many apparatus, a judgment variation by a plurality of users may be reduced, by which a level of abnormal image acceptable or not-acceptable for whole apparatuses used in one entity can be set to a similar level.

Further, because such historical data can be provided as text data in addition to invisible electronic data, the user may be convinced how a maintenance work is conducted for apparatus. Further, when inputting a judgment result of abnormal image by a user, fee/charge change information is displayed in case of accepting simulated image (or abnormal image). Such fee change information may increase a probability of selecting "Acceptable" button by a user, by which a lifetime of each part may be increased. Further, a user can select a replacement or non-replacement of each part with considering fee/charge information changeable depending on image quality, by which a lifetime of parts can be increased depending on needs of user.

Furthermore, in the above-described example embodiment, each unit shown in FIG. 2 can be disposed in a given place, as required. For example, the failure prediction unit 20, the image identification unit 22, the simulated-image generating unit 24, the first level setting unit 21, the second level setting unit 23, the output unit 25, the input unit 26, the image level determination unit 27, the level adjustment unit 30, the call unit 28 and the database 29 may be included in the image forming apparatus 100.

However, it should be noted some of the units can be disposed outside the image forming apparatus 100. For example, some units such as failure prediction unit 20, image identification unit 22, and database 29 may be disposed outside the image forming apparatus 100. In such a case, such units disposed outside the image forming apparatus 100 may be coupled to the image forming apparatus 100 via a network such as Internet. Such configuration may be selected depending on a concept of a whole system, for example.

Embodiments of the present invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art. Embodiments of the present application may also be implemented by the preparation of application specific integrated circuits or by interconnecting an appropriate network of conventional component circuits, as will be readily apparent to those skilled in the art.

Numerous additional modifications and variations are possible in light of the above teachings. It is therefore to be understood that within the scope of the appended claims, the disclosure of the present invention may be practiced otherwise than as specifically described herein.

What is claimed is:

1. An image forming apparatus, comprising:
a failure prediction unit configured to prepare an index value indicating a condition of the image forming apparatus based on multidimensional signal, obtained by monitoring the image forming apparatus, and to compare the index value with a first threshold value to predict a failure mode of the image forming apparatus;
an image identification unit configured to identify an image abnormality based on the failure mode predicted by the failure prediction unit, an identified image abnormality being an abnormality predicted to appear at a given time later if an image forming operation conducted under a condition predicted by the index value is executed;
a simulated-image generating unit configured to generate a simulated image including the identified image abnormality; and
an output unit configured to output the simulated image.

2. The image forming apparatus according to claim 1, wherein the first threshold value is adjustable.

3. The image forming apparatus according to claim 2, further comprising an input unit configured to input a judgment result of an operator for accepting or not accepting the simulated image output by the output unit, the judgment result is used to adjust a second threshold value.

4. The image forming apparatus according to claim 3, wherein the second threshold value is adjustable by the operator.

5. The image forming apparatus according to claim 4, further comprising a level adjustment unit, and wherein the second threshold value is adjusted with the level adjustment unit when the judgment result of the simulated image is acceptable, in which a value of an adjusted second threshold value is less severe compared to a value of the second threshold value before adjustment.

6. The image forming apparatus according to claim 4, further comprising a call unit configured to call a maintenance request to a maintenance service entity when the judgment result of the simulated image is unacceptable.

7. The image forming apparatus according to claim 3, further comprising a storage unit configured to store historical data for operation conditions of the image forming apparatus including the first threshold value and the second threshold value.

8. The image forming apparatus according to claim 7, wherein the output unit outputs the historical data as text data.

9. The image forming apparatus according to claim 1, wherein the simulated image is generated and output by using a print job data, which is actually used by an operator.

10. The image forming apparatus according to claim 9, wherein the output unit outputs a plurality of simulated images having a plurality of levels using the print job data, which is actually used by the operator.

11. The image forming apparatus according to claim 10, wherein the plurality of simulated images having the plurality of levels is output on one sheet.

12. The image forming apparatus according to claim 1, further comprising:
- a memory storing computer executable instructions; and
- a processor that executes the computer executable instructions.

13. The image forming apparatus according to claim 1, wherein the output unit is a printing device, and the simulated image is printed on a recording medium.

14. The image forming apparatus according to claim 1, wherein the failure prediction unit is configured to use sensor readings regarding operational characteristics of the image forming apparatus to generate the multidimensional signal, and the image identification unit is configured to identify the image abnormality by using a table that pairs image abnormalities to the operational characteristics.

15. The image forming apparatus of claim 1, wherein the simulated-image generating unit adjusts one or more operational parameters of the image forming apparatus that cause the output unit to output the simulated image including the identified image abnormality.

16. A method of managing images produced by an image forming apparatus, comprising:
- preparing an index value indicating a condition of the image forming apparatus based on multidimensional information, obtained by monitoring the image forming apparatus;
- predicting a failure mode of the image forming apparatus by comparing the index value with a first threshold value;
- identifying an image abnormality based on the failure mode, an identified image abnormality being an abnormality predicted to appear in an image at a given time later if an image forming operation is conducted under a condition predicted by the index value;
- generating a simulated image including the identified image abnormality; and
- outputting the simulated image.

17. A non-transitory computer readable storage medium encoded with instructions, which when executed by an image forming apparatus, causes the image forming apparatus to execute a method comprising:
- preparing an index value indicating a condition of the image forming apparatus based on multidimensional information, obtained by monitoring the image forming apparatus;
- predicting a failure mode of the image forming apparatus by comparing the index value with a first threshold value;
- identifying an image abnormality based on the failure mode, an identified image abnormality being an abnormality predicted to appear in an image at a given time later if an image forming operation is conducted under a condition predicted by the index value;
- generating a simulated image including the identified image abnormality; and
- outputting the simulated image.

* * * * *